United States Patent
John

(10) Patent No.: US 9,544,704 B1
(45) Date of Patent: Jan. 10, 2017

(54) SYSTEM AND METHOD FOR EVALUATING MEDIA SEGMENTS FOR INTERESTINGNESS

(71) Applicant: Avaya Inc., Santa Clara, CA (US)

(72) Inventor: Ajita John, Holmdel, NJ (US)

(73) Assignee: Avaya Inc., Santa Clara, CA (US)

( * ) Notice: Subject to any disclaimer, the term of this patent is extended or adjusted under 35 U.S.C. 154(b) by 0 days.

(21) Appl. No.: 14/800,874

(22) Filed: Jul. 16, 2015

(51) Int. Cl.
*H04S 5/00* (2006.01)

(52) U.S. Cl.
CPC ..................... *H04S 5/00* (2013.01)

(58) Field of Classification Search
CPC .................. H04S 5/00; H04S 7/302
See application file for complete search history.

(56) References Cited

U.S. PATENT DOCUMENTS

| | | | |
|---|---|---|---|
| 7,392,250 B1* | 6/2008 | Dash | G06F 17/30539 707/600 |
| 8,527,515 B2 | 9/2013 | Zelevinsky et al. | |
| 8,942,540 B2* | 1/2015 | Konuma | G10L 99/00 386/248 |
| 2006/0242139 A1* | 10/2006 | Butterfield | G06F 17/30265 |
| 2009/0006438 A1 | 1/2009 | Tunkelang et al. | |
| 2009/0240650 A1* | 9/2009 | Wang | G06F 17/30796 706/54 |
| 2010/0161580 A1* | 6/2010 | Chipman | G06F 17/3053 707/706 |
| 2010/0274667 A1* | 10/2010 | Lanham | G06F 17/30026 705/14.49 |
| 2012/0323897 A1* | 12/2012 | Daher | G06F 17/30026 707/723 |
| 2014/0185823 A1 | 7/2014 | Seligmann et al. | |
| 2014/0344012 A1 | 11/2014 | Kamhi et al. | |

* cited by examiner

*Primary Examiner* — Brenda Bernardi
(74) *Attorney, Agent, or Firm* — Sheridan Ross P.C.

(57) ABSTRACT

Disclosed herein are systems, methods, and computer-readable storage device for analyzing a first audiofile, to yield a first analysis, wherein the first analysis identifies a first segment of a first plurality of segments within the first audiofile, the first segment being one of a most interesting segment, a most important segment, a most relevant segment, and a most representative segment. A same analysis can be performed on a second audiofile, to yield a second analysis, wherein the second analysis identifies a second segment of a second plurality of segments within the second audiofile, the second segment comprising one of a most interesting segment, a most important segment, a most relevant segment, and a most representative segment. The first segment is presented as a representative segment of the first audiofile and the second segment is presented as a representative of the second audiofile within a three-dimensional audio space.

20 Claims, 4 Drawing Sheets

SYSTEM AND METHOD FOR EVALUATING MEDIA SEGMENTS FOR INTERESTINGNESS

BACKGROUND

1. Technical Field

The present disclosure relates to analyzing audiofiles and identifying representative segments of the audiofiles for presentation to a user.

2. Introduction

Many organizations store important conversations and audio meetings in a large repository of audio files. This allows users to play and listen to old or previous conversations at any time convenient to the user. However, as the number of audio files stored in a repository grows, it becomes harder for users to locate specific conversations. Moreover, often times, the user is not interested in listening to an entire conversation, but simply wants to listen to a specific portion of the conversation that is of interest to the user. For example, the user may wish to only listen to a summary of the conversation, an introduction of the conversation participants, or a list of action items at the end of the conversation.

As the number of conversations in the repository grows, it becomes more difficult to locate the specific portions desired because as the user must first identify the file (i.e., the conversation) and then the specific portion of interest from the file. If the user is not familiar with the conversation, the user often must listen to a large portion of the conversation (if not the entire conversation) to determine if she is interested in the conversation. Such solutions do not efficiently make the user aware of what each conversation is about and can be improved upon.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are approaches for analyzing audiofiles and identifying representative segments of the audiofiles for presentation to a user, particularly in a three-dimensional audio space.

A three-dimensional audio space is described in U.S. patent application Ser. No. 13/728,467, the contents of which are incorporated herein in its entirety.

This disclosure deals with a system that allows users to obtain specific segments or portions of a conversation as users browse through audio content in a three-dimensional audio space. More specifically, when the user browses through audio in audio conversations, the system can present audio previews/snippets of each audio conversation, where the audio previews/snippets can be the most interesting, recognizable, relevant, popular, and/or representative portions of the conversation. In other words, as the user browses through audio conversations, she can listen to audio segments in each conversation to obtain a preview of specific conversations, providing search results for appropriate segments by "highlighting" segments where specific markers identify keywords/topics/information associated with the search are found in recorded conversations. Such browsing can occur within a singular audio conversation or among multiple audio conversations.

An exemplary system, configured according to this disclosure, analyzes a first audiofile, to yield a first analysis, wherein the first analysis identifies a first segment of a first plurality of segments within the first audiofile, the first segment being one of a most interesting segment, a most important segment, a most relevant segment, and a most representative segment. The system also performs the same analysis on a second audiofile, to yield a second analysis, wherein the second analysis identifies a second segment of a second plurality of segments within the second audiofile, the second segment comprising one of a most interesting segment, a most important segment, a most relevant segment, and a most representative segment. The system then presents the first segment as a representative segment of the first audiofile and the second segment as a representative of the second audiofile within a three-dimensional audio space.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

The present disclosure addresses analyzing audiofiles and identifying representative segments of the audiofiles for presentation to a user in a three-dimensional audio space. A system, method and computer-readable media are disclosed which perform such analyses and presentation. A brief introductory description of a basic general purpose system or computing device in FIG. 1 which can be employed to practice the concepts is disclosed herein. A more detailed description of analyzing audiofiles for presentation of representative segments within a three-dimensional audiospace will then follow, accompanied by exemplary variations. These variations shall be described herein as the various embodiments are set forth. The disclosure now turns to FIG. 1.

Figure 1:
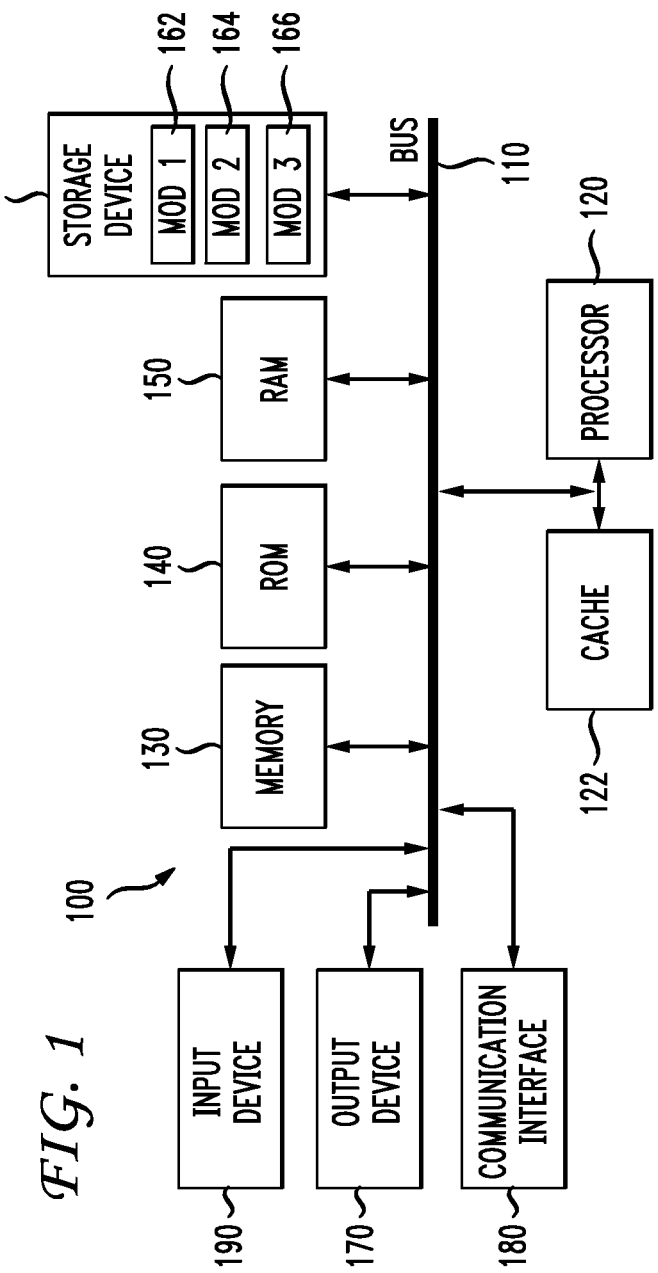
FIG. 1 illustrates an exemplary system embodiment.

With reference to FIG. 1, an exemplary system 100 includes a general-purpose computing device 100, including a processing unit (CPU or processor) 120 and a system bus 110 that couples various system components including the system memory 130 such as read only memory (ROM) 140 and random access memory (RAM) 150 to the processor 120. The system 100 can include a cache 122 of high speed memory connected directly with, in close proximity to, or integrated as part of the processor 120. The system 100 copies data from the memory 130 and/or the storage device 160 to the cache 122 for quick access by the processor 120. In this way, the cache provides a performance boost that avoids processor 120 delays while waiting for data. These and other modules can control or be configured to control the processor 120 to perform various actions. Other system memory 130 may be available for use as well. The memory 130 can include multiple different types of memory with different performance characteristics. It can be appreciated that the disclosure may operate on a computing device 100 with more than one processor 120 or on a group or cluster of computing devices networked together to provide greater processing capability. The processor 120 can include any general purpose processor and a hardware module or software module, such as module 1 162, module 2 164, and module 3 166 stored in storage device 160, configured to control the processor 120 as well as a special-purpose processor where software instructions are incorporated into the actual processor design. The processor 120 may essentially be a completely self-contained computing system, containing multiple cores or processors, a bus, memory controller, cache, etc. A multi-core processor may be symmetric or asymmetric.

The system bus 110 may be any of several types of bus structures including a memory bus or memory controller, a peripheral bus, and a local bus using any of a variety of bus architectures. A basic input/output (BIOS) stored in ROM 140 or the like, may provide the basic routine that helps to transfer information between elements within the computing device 100, such as during start-up. The computing device 100 further includes storage devices 160 such as a hard disk drive, a magnetic disk drive, an optical disk drive, tape drive or the like. The storage device 160 can include software modules 162, 164, 166 for controlling the processor 120. Other hardware or software modules are contemplated. The storage device 160 is connected to the system bus 110 by a drive interface. The drives and the associated computer-readable storage media provide nonvolatile storage of computer-readable instructions, data structures, program modules and other data for the computing device 100. In one aspect, a hardware module that performs a particular function includes the software component stored in a tangible computer-readable storage medium in connection with the necessary hardware components, such as the processor 120, bus 110, display 170, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 100 is a small, handheld computing device, a desktop computer, or a computer server.

Although the exemplary embodiment described herein employs the hard disk 160, other types of computer-readable media which can store data that are accessible by a computer, such as magnetic cassettes, flash memory cards, digital versatile disks, cartridges, random access memories (RAMs) 150, read only memory (ROM) 140, a cable or wireless signal containing a bit stream and the like, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 100, an input device 190 represents any number of input mechanisms, such as a microphone for speech, a touch-sensitive screen for gesture or graphical input, keyboard, mouse, motion input, speech and so forth. An output device 170 can also be one or more of a number of output mechanisms known to those of skill in the art. In some instances, multimodal systems enable a user to provide multiple types of input to communicate with the computing device 100. The communications interface 180 generally governs and manages the user input and system output. There is no restriction on operating on any particular hardware arrangement and therefore the basic features here may easily be substituted for improved hardware or firmware arrangements as they are developed.

For clarity of explanation, the illustrative system embodiment is presented as including individual functional blocks including functional blocks labeled as a "processor" or processor 120. The functions these blocks represent may be provided through the use of either shared or dedicated hardware, including, but not limited to, hardware capable of executing software and hardware, such as a processor 120, that is purpose-built to operate as an equivalent to software executing on a general purpose processor. For example the functions of one or more processors presented in FIG. 1 may be provided by a single shared processor or multiple processors. (Use of the term "processor" should not be construed to refer exclusively to hardware capable of executing software.) Illustrative embodiments may include microprocessor and/or digital signal processor (DSP) hardware, read-only memory (ROM) 140 for storing software performing the operations described below, and random access memory (RAM) 150 for storing results. Very large scale integration (VLSI) hardware embodiments, as well as custom VLSI circuitry in combination with a general purpose DSP circuit, may also be provided.

The logical operations of the various embodiments are implemented as: (1) a sequence of computer implemented steps, operations, or procedures running on a programmable circuit within a general use computer, (2) a sequence of computer implemented steps, operations, or procedures running on a specific-use programmable circuit; and/or (3) interconnected machine modules or program engines within the programmable circuits. The system 100 shown in FIG. 1 can practice all or part of the recited methods, can be a part of the recited systems, and/or can operate according to instructions in the recited tangible computer-readable storage media. Such logical operations can be implemented as modules configured to control the processor 120 to perform particular functions according to the programming of the module. For example, FIG. 1 illustrates three modules Mod1 162, Mod2 164 and Mod3 166 which are modules configured to control the processor 120. These modules may be stored on the storage device 160 and loaded into RAM 150 or memory 130 at runtime or may be stored in other computer-readable memory locations.

Figure 2:
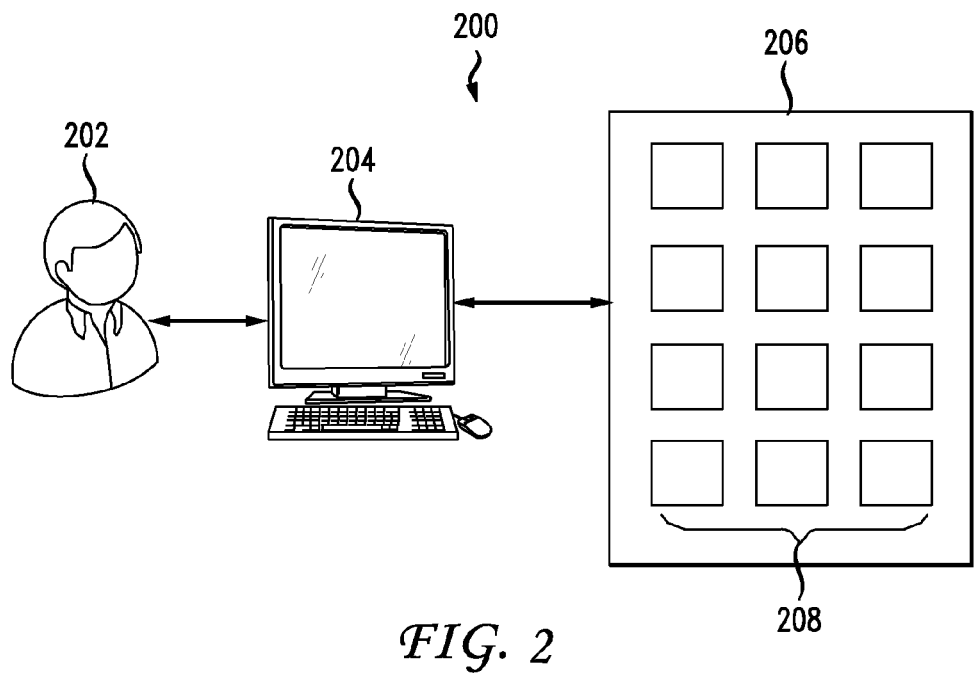
FIG. 2 illustrates an exemplary network configuration.

Having disclosed some components of a computing system, the disclosure now turns to FIG. 2, which illustrates an exemplary network configuration 200. In this configuration 200, a user 202 is interacting with a computing device 204. The computing device 204 can be a desktop computer, a laptop, a tablet, a smartphone, a virtual computer, or any other device having network connections and the capacity to present content to the user. The user 202 uses the computing device 204 to browse through a repository 206 of audiofiles 208.

The browsing of the audiofiles 208 can occur in a variety of formats. For example, the user 202 can be presented with a list of the stored audiofiles 208, where when the user moves a cursor on a computing device display to any particular audiofile a representative segment of that particular audiofile is played for the user. In other embodiments, the user 202 can browse for a particular recording of a conference call in the recorded audiofiles 208 using a three-dimensional audio space.

Figure 3:
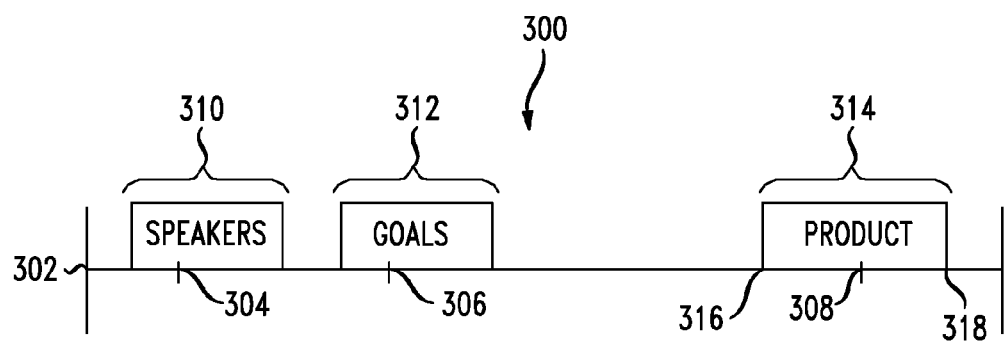
FIG. 3 illustrates identification of various segments in a single audiofile.

FIG. 3 illustrates identification of various segments in a single audiofile 300, which is performed as part of the analysis of an audiofile 302. The system identifies segments 310, 312, 314 corresponding to themes, categories, topics, or other areas of interest to a user, within the audiofile 302. For example, categories of segments which the system can identify include a most interesting segment, a most important segment, a most relevant segment, a most popular segment, and a most representative segment. In some cases, a single segment can correspond to more than one category, topic, or classification. For example, a single segment can be both the most popular and the most interesting segment of an audiofile.

Determining which segment is most interesting can rely on user identities and preferences, context information, and/or trending analytics. For example, the user identity of the person browsing through the audiofiles may be associated with a job title which establishes which portions of the audiofiles is relevant. That is, the segment of an audiofile which will be most interesting to a sports broadcaster may vary from the segment which is most interesting to a fireman. If the most interesting segment is based on context information, the system can use information such as time (time of day when the audiofile was recorded), location (of audiofile recording), a user identity of the user, an age of each audiofile, a content of a browsing request, an age of the user, and/or a category of the audiofile to determine which segment is the most interesting. Other algorithms for determining which segment of an audiofile is most interesting to a user can also be used without deviating from the scope of this invention.

Some factors which can be used to determine popularity and/or interestingness can be: a number of user-generated tags and/or comments (showing interest in a segment), a length of tags and/or comments for a segment (showing interest in a segment), a number of speakers (i.e., turn taking) in a segment (showing interactiveness in a segment), a dominance of certain speakers (e.g., the segments for which an authority figure may be featured more prominently), social media markers (such as ratings, tags, ranking), and/or social cohesion of speakers with a user performing the search (where social cohesion may be defined as a relationship strength between the speakers and the user based on history). Such factors are exemplary only, and other factors may be used to determine how interesting a user will find a particular segment, or how popular a segment is. Regarding popularity, such determinations can be made based on geographic location, nationality, language, world-wide popularity, references on specific websites (rather than all web-traffic), friends, business colleagues, or other groups of individuals.

Determining which segments are the most important, relevant, or representative can use any of those same algorithms for determining which segment is most interesting, tailoring those algorithms to select segments based on the particular feature being sought. For example, an algorithm may determine that a segment would be most interesting to a user based on listening patterns or history of a particular user, whereas which segment is most important can be determined based on which segment most closely aligns with the user's job title, and the segment which is most relevant is based on a keyword search of words spoken by the user in the past five minutes (or other time period).

The identification of the segments 310, 312, 314 can be further based on searching an audiofile for specific keywords. The keywords can be specific to a user or job title, or can be generic. For example, when searching any audiofile which is a recording of a conference call, the various parties will generally introduce themselves. Therefore a list of keywords can search for words associated with introductions on a conference call, such as "This is xxx", "I'm here," etc. Other exemplary word lists can include action items, goals, problems, achievements, and personnel. As the system performs a keyword search on an audiofile, specific instances 304, 306, 308 are identified as matching the keyword.

Searching the audiofile for the keywords can be a comparison of recorded audio waveforms or by using a transcript to search for the keywords in conjunction with a timetable itemizing when the words were spoken. As the specific instances 304, 306, 308 of keywords are noted, the system defines a time period associated with each specific instance, where the identified segment is the portion of the audiofile corresponding to the time period defined. Often, the time period will (as illustrated) extend before and after the instance where the keyword was found. For example, as illustrated, words were identified in the audiofile 302 corresponding to identification of "Goals" at point 306, resulting in a segment 312 being defined which extends before and after the point 306 where the goal-related words were found. In other instances, the segment might extend exclusively before or after the point where the trigger words were found.

Figure 4:
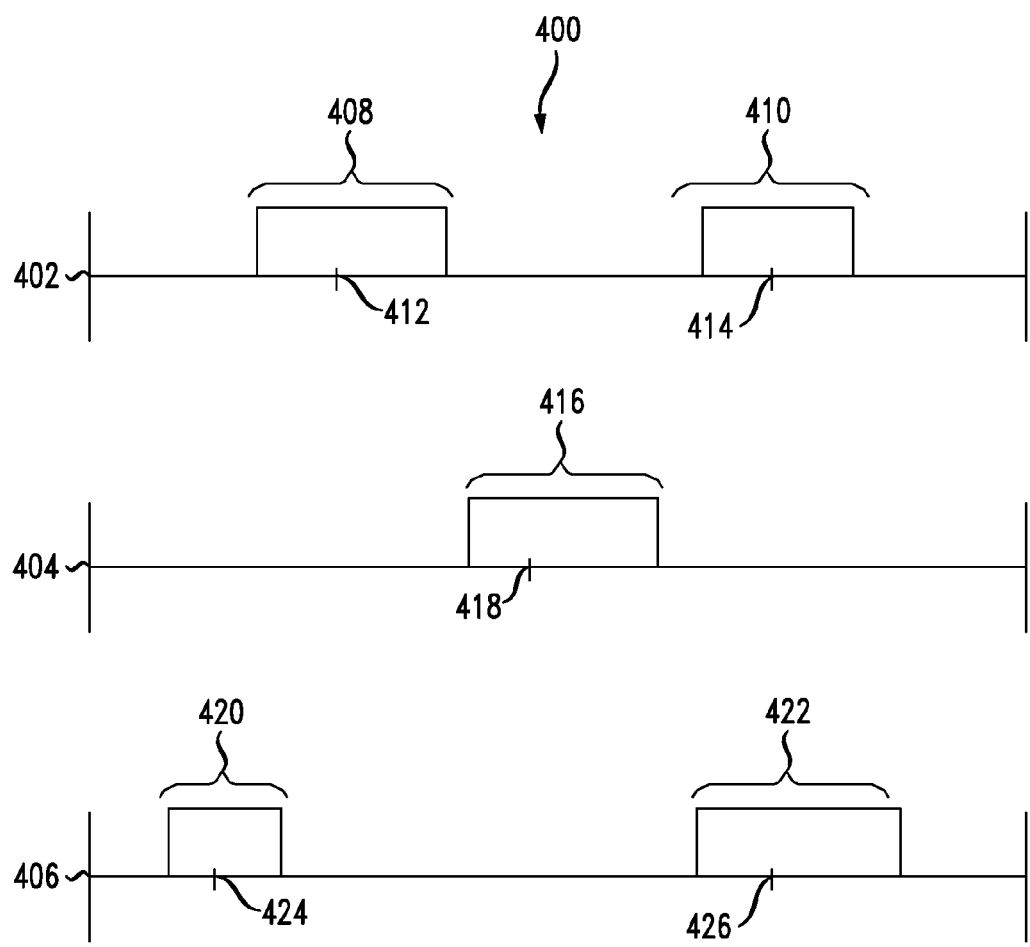
FIG. 4 multiple audiofiles having identified segments.

FIG. 4 illustrates multiple audiofiles 402, 404, 406 having identified segments 400. As the user browses the audiofiles 402, 404, 406, the system identifies one of the identified segments from each of the audiofiles 402, 404, 406 as a representative segment for each audiofile. As the user browses each respective audiofile, the representative segment identified by the system will be presented to the user.

Consider the second audiofile 404 where the system is seeking to present segments which are most important to a user. Only a single instance 418 of words which are important to the user is found, corresponding to a single segment 416. By contrast, the first audiofile 402 and the third audiofile both have multiple instances of important words (412, 414, 424, 426) resulting in each audiofile having multiple segments which are important (408, 410, 420, 422). In such circumstances, the system performs an additional analysis to determine which segment in the multiple segments for each audiofile is "more" important. Such determination can be based on a frequency of words found on the keyword list, a volume of the words being spoken, repetition of the words, or who is speaking the words.

During presentation of the audiofiles 402, 404, 406, the system presents the representative segments to the user. In various embodiments, the user can then select which of the audiofiles is sought. Such selection can be made by direct user input (such as a click, vocal selection, and/or motion indicating the selection) or by indirect user input (lingering on a particular audiofile, listening to portions other than the representative segment, etc.). In one embodiment, a user browsing the audiofiles can be in a three-dimensional audio space, where all the audiofiles 402, 404, 406 are being played simultaneously, and as user moves about the three-dimensional audio space (i.e., gets closer to certain audiofiles and further from others) the volumes of the respective audiofiles changes based on the virtual distance between the user and the audiofiles within the three-dimensional audio space. In another configuration, the user is again browsing in a three-dimensional audio space with all of the respective audiofiles 402, 404, 406 again playing simultaneously. However, in this embodiment, the audiofiles all play in their entirety, with the representative segments increasing in volume for each respective audiofile as those respective segments are played.

Figure 5:
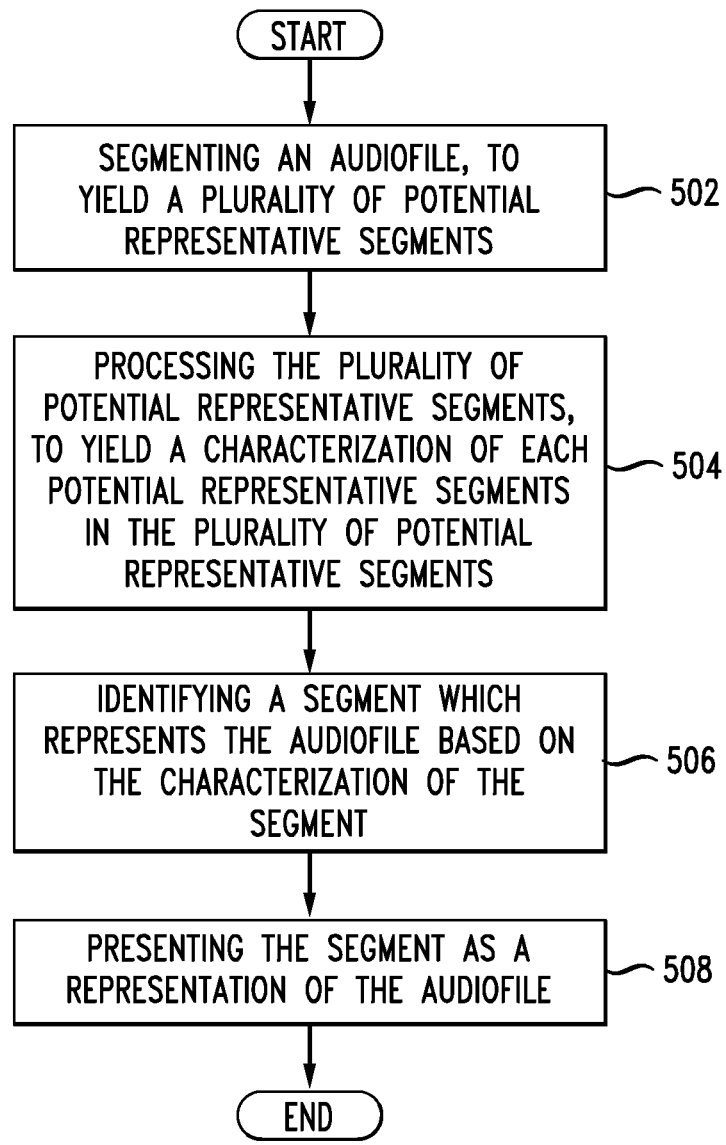
FIG. 5 illustrates an example method embodiment.

Having disclosed some basic system components and concepts, the disclosure now turns to the exemplary method embodiment shown in FIG. 5. For the sake of clarity, the method is described in terms of an exemplary system 100 as shown in FIG. 1 configured to practice the method. The steps outlined herein are exemplary and can be implemented in any combination thereof, including combinations that exclude, add, or modify certain steps.

The system 100 analyzes a first audiofile, to yield a first analysis, wherein the first analysis identifies a first segment of a first plurality of segments within the first audiofile, the first segment being one of a most interesting segment, a most important segment, a most relevant segment, and a most representative segment (502). The system 100 also analyzes a second audiofile, to yield a second analysis, wherein the second analysis identifies a second segment of a second plurality of segments within the second audiofile, the second segment comprising one of a most interesting segment, a most important segment, a most relevant segment, and a most representative segment (504). The system 100 can then present the first segment as a representative segment of the first audiofile and the second segment as a representative of the second audiofile within a three-dimensional audio space (506).

The presenting of the first segment and the second segment can occur within the three-dimensional audio space simultaneously, where the presenting is performed by moving a respective segment closer to a user within the three-dimensional audio space during play of the respective segment, and away from the user while not playing the respective segment. The user can then select an audiofile based on their behavior within the three-dimensional audio space. For example, within the virtual environment of the three-dimensional audio space, the user might not move for a certain period of time. Another example would be the user providing input from the real-world into the three-dimensional audio space, or the user listening to the entirety of the audiofile (as opposed to only the representative segment).

User preferences which can affect which segment is selected as the representative segment can include user history (such as selection and browsing history), age, job title, place of employment, recent conversations, calendar information (such as what meetings are upcoming), family information (names of family, professions of family members, job titles of family members, etc.). User identity can affect the which segments are selected by identifying, based on the user identity, a ranked list of topics important to the user which can be used in turn to determine which segments best represent the audiofiles. The system 100 can also rely on context information in determining which segment should be selected as the representative segment. Examples of context information include time, location, a user identity of a user, an age of each audiofile, a content of a request, an age of the user, and a category of the each audiofile.

The system 100 can also select the representative segments based on the popularity of the segment. For example, if one segment in the audiofile has been played over a million times, and another segment has only been played a hundred times, the segment which has been played a million times will be determined to be more popular. More specifically, the popular segment can be determined based on a ratio of times a respective segment has been played versus times other segments in the audiofile have been played. Such determinations of popularity can have a time factor. For example, if a particular segment has been very popular in the past day, but has not been the most popular over the lifetime of the audiofile, the system 100 can determine that the particular segment should be selected as the most popular segment. Other time periods (hours, days, weeks, months, etc.) are likewise within the scope of this disclosure for determining popularity of a respective segment.

Embodiments within the scope of the present disclosure may also include tangible and/or non-transitory computer-readable storage media for carrying or having computer-executable instructions or data structures stored thereon. Such tangible computer-readable storage media can be any available media that can be accessed by a general purpose or special purpose computer, including the functional design of any special purpose processor as described above. By way of example, and not limitation, such tangible computer-readable media can include RAM, ROM, EEPROM, CD-ROM or other optical disk storage, magnetic disk storage or other magnetic storage devices, or any other medium which can be used to carry or store desired program code means in the form of computer-executable instructions, data structures, or processor chip design. When information is transferred or provided over a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable media.

Computer-executable instructions include, for example, instructions and data which cause a general purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof)

through a communications network. In a distributed computing environment, program modules may be located in both local and remote memory storage devices.

The various embodiments described above are provided by way of illustration only and should not be construed to limit the scope of the disclosure. For example, the principles herein apply both to presenting representative segments of audiofiles both in and out of three-dimensional audio spaces. Various modifications and changes may be made to the principles described herein without following the example embodiments and applications illustrated and described herein, and without departing from the spirit and scope of the disclosure.

I claim:

1. A method comprising:
   analyzing a first audiofile, to yield a first analysis, wherein the first analysis identifies a first segment of a first plurality of segments within the first audiofile, the first segment being one of a most interesting segment, a most important segment, a most relevant segment, and a most representative segment;
   analyzing a second audiofile, to yield a second analysis, wherein the second analysis identifies a second segment of a second plurality of segments within the second audiofile, the second segment comprising one of a most interesting segment, a most important segment, a most relevant segment, and a most representative segment; and
   presenting the first segment as a representative segment of the first audiofile and the second segment as a representative of the second audiofile within a three-dimensional audio space.

2. The method of claim 1, further comprising:
   presenting the first segment and the second segment within the three-dimensional audio space simultaneously, wherein the presenting comprises moving a respective segment closer to a user within the three-dimensional audio space during play of the respective segment, and away from the user while not playing the respective segment.

3. The method of claim 2, further comprising receiving a selection of an audiofile based on a behavior of the user within the three-dimensional audio space.

4. The method of claim 1, wherein the first segment and the second segment are based on user preferences.

5. The method of claim 4, wherein the first segment and the second segment are further based on context information.

6. The method of claim 5, wherein the context information comprises one of: time, location, a user identity of a user, an age of each audiofile, a content of a request, an age of the user, and a category of the each audiofile.

7. The method of claim 1, the first segment and the second segment represent a most popular segment in a respective audiofile.

8. The method of claim 7, wherein the most popular segment is based on a ratio of times a respective segment has been played versus times other segments in each respective audiofile have been played.

9. The method of claim 1, further comprising:
   identifying, based on an identity of a user, a ranked list of topics important to the user, wherein the most important segment of the first audiofile and the most important segment of the second audiofile is based on the ranked list of topics.

10. A system comprising:
    a processor; and
    a computer-readable storage medium having instructions stored which, when executed by the processor, cause the processor to perform operations comprising:
       analyzing a first audiofile, to yield a first analysis, wherein the first analysis identifies a first segment of a first plurality of segments within the first audiofile, the first segment being one of a most interesting segment, a most important segment, a most relevant segment, and a most representative segment;
       analyzing a second audiofile, to yield a second analysis, wherein the second analysis identifies a second segment of a second plurality of segments within the second audiofile, the second segment comprising one of a most interesting segment, a most important segment, a most relevant segment, and a most representative segment; and
       presenting the first segment as a representative segment of the first audiofile and the second segment as a representative of the second audiofile within a three-dimensional audio space.

11. The system of claim 10, the computer-readable storage medium having additional instructions stored which, when executed by the processor, cause the processor to perform operations comprising:
    presenting the first segment and the second segment within the three-dimensional audio space simultaneously, wherein the presenting comprises moving a respective segment closer to a user within the three-dimensional audio space during play of the respective segment, and away from the user while not playing the respective segment.

12. The system of claim 11, the computer-readable storage medium having additional instructions stored which, when executed by the processor, cause the processor to perform operations comprising receiving a selection of an audiofile based on a behavior of the user within the three-dimensional audio space.

13. The system of claim 10, wherein the first segment and the second segment are based on user preferences.

14. The system of claim 13, wherein the first segment and the second segment are further based on context information.

15. The system of claim 14, wherein the context information comprises one of: time, location, a user identity of a user, an age of each audiofile, a content of a request, an age of the user, and a category of the each audiofile.

16. The system of claim 10, the first segment and the second segment represent a most popular segment in a respective audiofile.

17. The system of claim 16, wherein the most popular segment is based on a ratio of times a respective segment has been played versus times other segments in each respective audiofile have been played.

18. The system of claim 10, the computer-readable storage medium having additional instructions stored which, when executed by the processor, cause the processor to perform operations comprising:
    identifying, based on an identity of a user, a ranked list of topics important to the user, wherein the most important segment of the first audiofile and the most important segment of the second audiofile is based on the ranked list of topics.

19. A computer-readable storage device having instructions stored which, when executed by a computing device, cause the computing device to perform operations comprising:

analyzing a first audiofile, to yield a first analysis, wherein the first analysis identifies a first segment of a first plurality of segments within the first audiofile, the first segment being one of a most interesting segment, a most important segment, a most relevant segment, and a most representative segment;

analyzing a second audiofile, to yield a second analysis, wherein the second analysis identifies a second segment of a second plurality of segments within the second audiofile, the second segment comprising one of a most interesting segment, a most important segment, a most relevant segment, and a most representative segment; and presenting the first segment as a representative segment of the first audiofile and the second segment as a representative of the second audiofile within a three-dimensional audio space.

20. The computer-readable storage device of claim 19, having additional instructions stored which, when executed by the computing device, cause the computing device to perform operations comprising:

presenting the first segment and the second segment within the three-dimensional audio space simultaneously, wherein the presenting comprises moving a respective segment closer to a user within the three-dimensional audio space during play of the respective segment, and away from the user while not playing the respective segment.

\* \* \* \* \*